Oct. 16, 1962     H. C. KIRKLAND     3,058,501

EGG SEPARATOR

Filed Nov. 8, 1960

*INVENTOR.*
HELEN C. KIRKLAND
BY
*ATTORNEY*

3,058,501
EGG SEPARATOR
Helen C. Kirkland, 2019 Kirkland St.,
West Columbia, S.C.
Filed Nov. 8, 1960, Ser. No. 67,939
2 Claims. (Cl. 146—2)

The present invention relates to an egg separating device for separating the whites of eggs from egg yolks.

A primary object of the invention is to provide a manually operated egg separator, primarily for use in the home, and adapted to be economically constructed and highly efficient in operation.

A further object of the invention is to provide an egg separator which will allow the egg white to be quickly and clearly separated from the yolk, without fear of puncturing the yolk sack.

Another object is to provide an egg separator of the above-mentioned character having means to assure complete separation of the egg white and yolk, and complete drainage of the white into an underlying receptacle or the like.

A further object is to provide an egg separator embodying a minimum number of simplified parts which are permanently connected so as not to become lost or separated, the device being readily operable with one hand and being easy to maintain in a clean or sanitary condition.

A further and more specific object of the invention is to provide an egg separator having a pivoted yolk elevating cup and resilient means to normally hold the cup seated upon the main receptacle body portion of the device.

Other objects and advantages of the invention will be apparent during the course of the following description.

Figure 1:
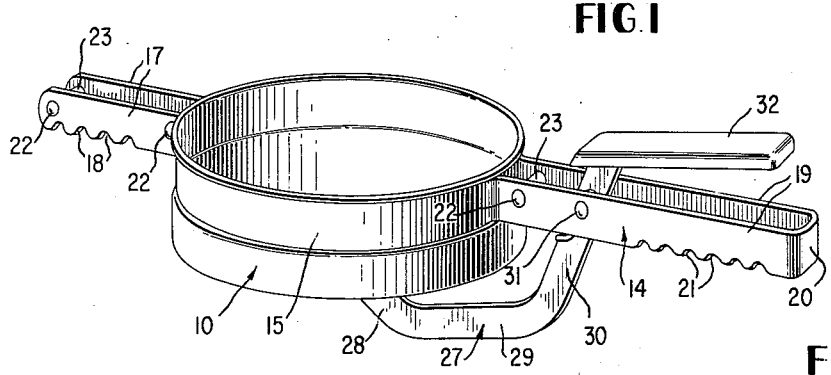
Figure 2:
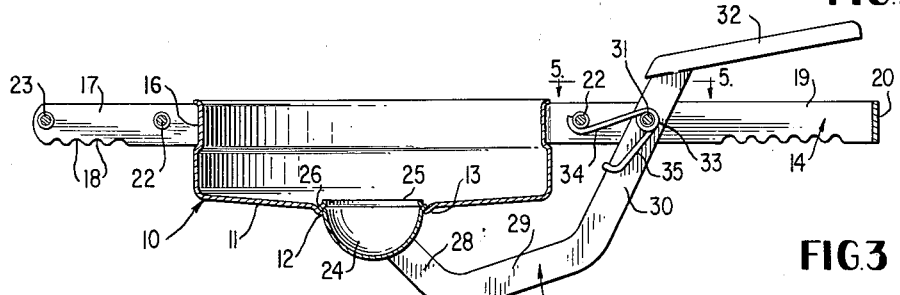
Figure 3:
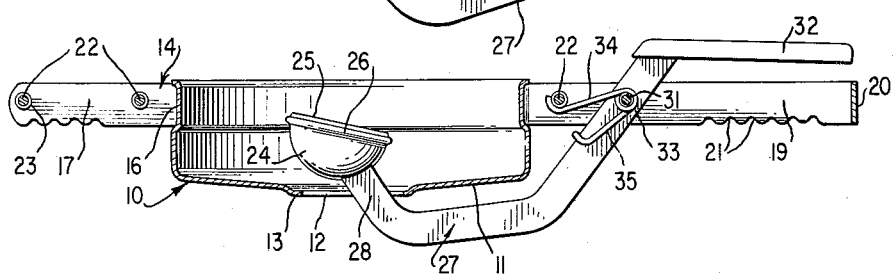
Figure 4:
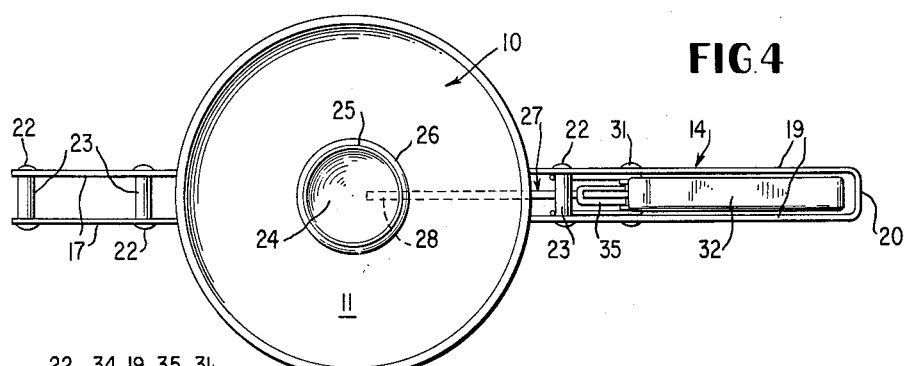
Figure 5:
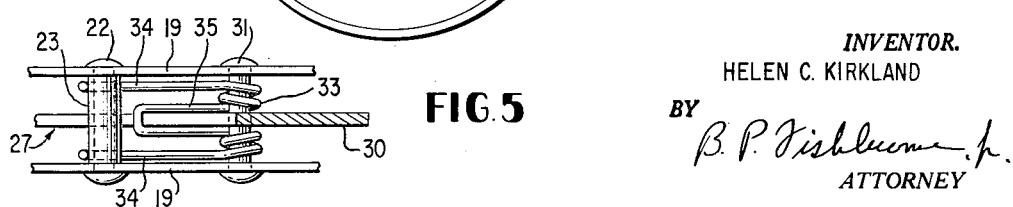

In the accompanying drawings forming a part of this application and in which like numerals are employed to designate like parts throughout the same, FIGURE 1 is a perspective view of an egg separator embodying the invention, FIGURE 2 is a central vertical longitudinal section through the same, FIGURE 3 is a similar section showing the yolk cup in the active or elevated position, FIGURE 4 is a plan view of the egg separator, FIGURE 5 is an enlarged fragmentary horizontal section taken on line 5—5 of FIGURE 2.

In the drawings, wherein for the purpose of illustration is shown a preferred embodiment of the invention, the numeral 10 designates generally a main receptacle or body portion which is substantially cylindrical and open at its top, and including a downwardly conically tapering bottom wall 11, as shown. The main receptacle 10 may be relatively shallow for compactness, and the bottom wall 11 has a central circular opening 12 formed therethrough, surrounded by a relatively narrow downwardly struck annular marginal flange 13, forming a seat for a yolk cup to be described.

The main receptacle 10 is secured to and bodily carried by a support frame 14 which may be conveniently formed from a single section of sheet metal or the like, and including companion identical sides, as shown in the drawings. The support frame 14 comprises opposed intermediate substantially semi-circular band portions 15, surrounding opposite sides of the main receptacle 10 snugly near the top thereof, and preferably seated within a shallow annular groove or recess 16 formed in the upper portion of the main receptacle during its fabrication. The main receptacle 10, and in fact all major components of the device, are well adapted to be formed of sheet metal, such as sheet aluminum or the like. However, it is desired not to limit the invention to the use of any particular material, and it should be understood that the egg separator may be constructed from other suitable materials, such as certain plastics material and the like.

The support frame 14 further comprises forward spaced parallel arm extensions 17, integral with the band portions 15 and extending radially forwardly of the main receptacle 10 for a substantial distance. The lower longitudinal edges of the extensions 17 are preferably notched at 18 to facilitate resting the egg separator upon the rim of a conventional mixing bowl, saucepan or the like. The support frame 14 further comprises rear spaced parallel elongated extensions 19, connected at their outer ends by an integral bight portion 20. The extensions 19 project radially of the main receptacle 10 in longitudinal alignment with the forward extensions 17 and are also integral with the band portions 15 surrounding and holding the receptacle 10. The extensions 19 are preferably notched in their lower longitudinal edges at 21, for the purpose already described in connection with the forward extensions 17. The spaced extensions 19 and bight portion 20 are adapted to serve as a handle for the egg separator as will be further described hereinafter.

The spaced parallel extensions 17 and 19 are connected rigidly by rivets 22 or the like, spaced apart as shown in the drawings, and carrying spacer sleeves 23 thereon between the extensions 17 and 19. The arrangement is such that when the extensions 17 and 19 are connected by the rivets or like fastener elements, the band sections 15 are drawn tightly around the main receptacle 10 to hold the same snugly and to prevent relative movement between the receptacle 10 and support frame 14. A pair of the rivets 22 are disposed relatively close to the annular side wall of the receptacle 10, as shown, to assure snug engagement of the band sections 15 therewith.

A substantially hemispherical egg yolk elevating or separating cup 24 is provided, open at its top and provided somewhat below its top annular edge 25 with an outstruck annular bead 26, integral therewith and adapted to engage the annular seat 13 in a substantially fluid tight manner. The yolk cup 24 below the bead 26 is engageable through the opening 12 and below such opening, as shown in FIGURE 2. When the bead 26 is seated against the seat 13, the top edge 25 of the yolk cup projects slightly above the bottom wall 11 of main receptacle 10 as shown in FIGURE 2. The major portion of the yolk cup 24 in the closed or seated position, FIGURE 2, projects bodily below the main receptacle 10, as shown.

The yolk cup 24 is secured rigidly to a relatively long underslung arm or lever 27 of laterally narrow construction and preferably formed of sheet metal. The lever 27 has a forward short inclined portion 28 secured directly to the cup 24 and extending radially downwardly therefrom at one side thereof. An upwardly inclined angular portion 29 is secured integrally to the portion 28 and extends rearwardly thereof to a more steeply inclined generally vertical portion 30, likewise formed integral therewith. The steeply inclined lever portion 30 extends between the handle extensions 19, somewhat rearwardly of the main receptacle 10 and is pivotally mounted for vertical swinging movement upon a rivet 31, or the like, spaced rearwardly from the adjacent rivet 22 and spanning the extensions 19 tranversely and rigidly secured thereto.

The top end of the steeply inclined lever portion 30 has rigidly secured thereto a generally horizontal handle extension 32, which may be formed of plastics material, wood or the like, shaped and colored as desired to render the device attractive to the eye. If preferred, the handle extension 32 may be formed of sheet metal and may in fact be integral with the lever 27 and merely formed by twisting the handle portion at the top of the lever portion 30 so as to lie in a plane at right angles thereto. The handle extension 32 of the lever 27 directly overlies the handle extensions 19, as shown, so that the user of the egg separator may grip the handle extensions 19 and 32 for operating the device with one hand above a saucepan or bowl if desired.

The yolk cup 24 is resiliently urged downwardly into seating engagement with the bottom of the main receptacle 10 by a torsion spring 33 having coils surrounding the rivet 31 on opposite sides of the lever 27 as best shown in FIGURE 5. Forward arm extensions 34 of the spring 33 engage under the adjacent rivet 22, and rear arm extensions 35 of the spring 33 engage over the forward longitudinal edge of the lever portion 30 as shown in the drawings. The spring 33 is tensioned to urge the lever 27 and yolk cup 24 downwardly toward the position shown in FIGURE 2, as stated.

The lever 27 is shaped so that when the handle extension 32 is swung downwardly toward the extensions 19 and against the force of the spring 33, the yolk cup 24 may be elevated to approximately the position shown in FIGURE 3, wherein the entire yolk cup is disposed bodily above the lower wall 11 of main receptacle 10 and the top edge 25 of the yolk cup is considerably inclined, FIGURE 3. In such position, the lever portion 28 extends upwardly through the bottom opening 12, and the lever portion 29 lies relatively close to the bottom wall 11 and approximately parallel thereto as shown in FIGURE 3. The shape of the lever 27 allows an adequate swing or movement for the cup 24, without rendering the device bulky or awkward. When the handle extension 32 is released, the spring 33 returns the lever 27 and yolk cup 24 automatically to the position shown in FIGURE 2.

In use, the support frame 14 may rest directly upon the rim of a bowl or saucepan, as stated, and in which case the notches 18 and 21 will serve to position the device fixedly thereon. If preferred, the egg separator may be bodily held in one hand above a bowl or saucepan as previously indicated.

In either case, the operation of the device for separating eggs is as follows. The whole raw egg, after breaking, is dropped gently into the main receptacle 10, while the yolk cup 24 is in the seated position shown in FIGURE 2. The egg yolk is preferably placed or dropped directly into the cup 24, which is of a proper size to accommodate the yolk of any normal size egg. The cup 24 will not accommodate the liquid egg white or any substantial portion thereof, and the egg white will rest upon the bottom wall 11 of the main receptacle 10.

The handle extension 32 is now depressed by the operator, and the yolk cup 24 is elevated to the position shown in FIGURE 3 for effectively separating the yolk within it from the egg white in the main receptacle. The upper edge 25 of the yolk cup allows quick and clean separation of the yolk from the egg white when the cup 24 is elevated. The inclination of the upper edge of the cup 24, shown clearly in FIGURE 3, causes any egg white remaining in the cup 24 to drain therefrom to complete the separation of the egg yolk and white. When the cup 24 is thus elevated, all of the egg white will readily drain from the main receptacle 10 through the bottom opening 12 and into the underlying bowl or saucepan, as should be obvious.

Due to the thinness of the lever 27 and the side radial disposition of the lever portion 28, there is little or no tendency for the egg white to stick or hang up on the lever portion 28, and all of the egg white will tend to drain readily into the underlying bowl. The separated egg yolk in the cup 24 may now be readily emptied into a jar or receptacle or placed aside in any desired manner apart from the egg white.

When the handle extension 32 is again released, the yolk cup 24 returns automatically to its position shown in FIGURE 2, and the device is ready for further use for separating the yolks and whites of additional eggs. When used as described, the device cleanly and efficiently separates egg yolks and whites in a rapid manner and without the likelihood of puncturing the egg yolks.

As shown in the drawings, the egg separator is substantially free of sharp corners or crevices which would be likely to collect dirt, and the entire device may be easily cleaned under running water or the like.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. An egg separator device comprising a main relatively large diameter and relatively shallow substantially cylindrical open top receptacle having a downwardly conically tapering generally horizontal bottom wall provided with a central relatively small diameter drain opening, a support for said receptacle carrying the same and adapted to rest upon the rim of an underlying bowl or the like, said support embracing the receptacle and having a pair of arms extending horizontally and radially beyond diametrically opposite sides of the receptacle for substantial distances, a lever of substantial length pivoted to and crossing one of said arms at a point spaced radially of the receptacle and extending above said arm and having a depressible substantially horizontal handle portion overlying said arm, said lever including a bottom portion generally parallel to said handle portion and underlying the bottom wall of the receptacle radially thereof, said bottom portion terminating in a short upturned portion engageable movably within said drain opening, an approximately hemispherical egg yolk cup secured to the top of said upturned portion and bodily carried thereby and adapted to be elevated by said lever bodily above the drain opening and within the receptacle when said handle portion is depressed toward said arm, and a spring connected with said lever and said arm and yieldingly urging said lever and cup downwardly, said cup provided near its top with an annular bead adapted for sealing engagement with said bottom wall about said drain opening when said lever is in a lowermost position under influence of said spring, said cup then disposed substantially bodily below said drain opening.

2. The invention according to claim 1, and wherein said support is a unitary structure including opposed approximately semi-circular band sections which surround said receptacle circumferentially and said arms of the support include spaced parallel arm sections integral with said band sections, said lever pivoted to said arm extending between said sections of said arm.

References Cited in the file of this patent

UNITED STATES PATENTS

| | | |
|---|---|---|
| 1,409,649 | Becker | Mar. 14, 1922 |
| 1,744,665 | Neubert | Jan. 21, 1930 |
| 2,720,232 | Denton | Oct. 11, 1955 |